April 16, 1968     R. L. SWANKE     3,378,711

STATOR STRUCTURE FOR DYNAMO-ELECTRIC MACHINES

Filed Oct. 19, 1965

INVENTOR

ROY L. SWANKE

United States Patent Office 3,378,711
Patented Apr. 16, 1968

3,378,711
STATOR STRUCTURE FOR DYNAMO-
ELECTRIC MACHINES
Roy L. Swanke, Newington, Conn., assignor to Dynamics Corporation of America, New York, N.Y., a corporation of New York
Filed Oct. 19, 1965, Ser. No. 497,620
7 Claims. (Cl. 310—260)

ABSTRACT OF THE DISCLOSURE

An end lamination which becomes an integral part of the lamination stack of the field structure of an electric motor. The end lamination includes a plurality of arcuate shroud members extending outwardly therefrom so as to provide a means for winding the associated coil in a rigid position.

---

This invention relates generally to a stator structure for a dynamo-electric machine and more particularly to a means associated with the stator structure for supporting the coils thereon.

It is a common practice in stators for dynamo-electric machines to provide relatively elaborate means for maintaining the coil means in a rigid and insulated position with relation to the field structure. Such practices have included means such as pegs extending from the field structure or double-ended clamping means which extend substantially beyond the field structure. Not only do such devices increase the overall dimensions of the motor, they require additional, and often costly additional manufacturing operations.

The present invention provides an improved stator construction wherein the coils are securely supported on the field structure by a device which is easily incorporated in the normal assembly operation of the stator structures.

Basically, the invention provides a stator having a field structure which comprises a plurality of annular laminated layers of magnetic material with a rigid element secured to both ends thereof. Integral with said rigid elements and extending outwardly of the laminated material are provided a plurality of arcuate shrouds. The rigid elements are designed so as to have substantially the same shape as the laminated layers and are thus easily incorporated in the assembly operation. The usual coils are then wound about associated shrouds at either end of the field structure.

The invention will be more clearly understood from the following description when taken in conjunction with the drawings wherein.

Figure 1:
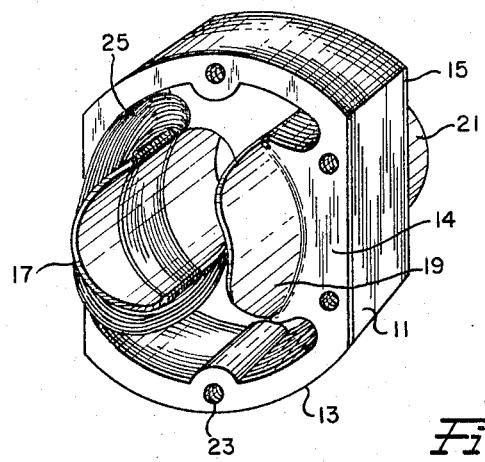
FIG. 1 is a perspective view of the field structure and support members of the present invention.

Turning now specifically to the drawings, there is shown in FIG. 1 a field structure 11 which is comprised of the usual plurality of laminated magnetic layers. These layers have an annular configuration designed so as to receive a rotor therethrough.

Mounted on either end of the field structure 11 are rigid plate members 13 and 15. Plates 13 and 15 have a flat face 14 and are of substantially the identical configuration as the laminated layers and, in effect, provide the two outside layers.

Plates 13 and 15 may be secured to the field structure by means such as bolts 23 which are normally used to secure the laminated magnetic layers together.

Figure 4:
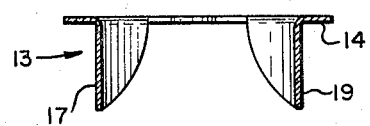
FIG. 4 is a sectional view taken along the lines 4—4 of FIG. 3.
Figures 2, 3:
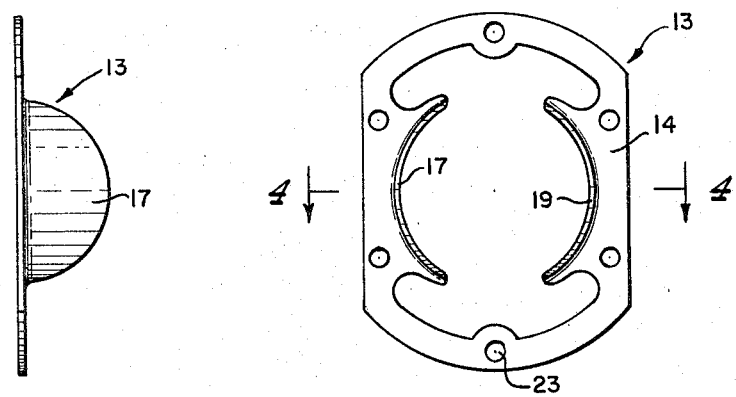
FIG. 2 is an end view of the support structure.
FIG. 3 is an elevational view of the support structure.

As shown in FIGS. 2–4, opposed shroud members 17 and 19 are integral with the plate 13 and extend outwardly from the field structure. Shroud members 17 and 19 are of arcuate shape so as to receive the rotor in the same manner as the field structure. Identical shroud members extend from the plate 15 as indicated by shroud 21.

Plates 13 and 15 are preferably of a magnetic material such as low carbon steel so as to add to the basic field structure.

It will be obvious that the mounting of the plates may be easily incorporated in the assembly procedure since they require no further securing operation other than that required for the laminated structure itself.

After the laminated layers and rigid plates are assembled, the entire structure is coated with a suitable insulating material such as an epoxy material. It is preferable to use a material which may be sprayed on the structure at an elevated temperature with a subsequent cooling and drying period. However, any material such as varnish is acceptable.

After the insulating coating has set, the coil may be wound on the field structure. Only one such coil 25 is shown in FIG. 1 for purposes of clarity. Since the shroud members are matched at opposed ends of the field structure, there is provided a secure means for supporting the wound coils.

It will now be obvious that the present invention provides a highly efficient and greatly simplified method for supporting the coils on a field structure. It is to be understood that the above description and associated drawings are illustrative only and the invention is to be limited only by the scope of the claims.

I claim:

1. In a dynamo-electric machine, a stator comprising
    a field structure having a plurality of laminated layers of magnetic material of annular configuration,
    a flat rigid element having substantially the same annular configuration as said laminated layers secured to both ends of said field structure,
    a plurality of arcuate shroud members integral with said rigid elements, each of said shroud members extending outwardly from the face of the associated said rigid element and said field structure, and
    a coil structure wound about said shroud members at opposed ends of said field structure.

2. The stator of claim 1 further comprising a coating of insulating material on said field structure, said element and said shroud members.

3. In a dynamo-electric machine, a stator structure comprising
    a field structure of annular shape adapted to receive a rotor therein,
    a flat rigid member having a shape substantially identical to said field structure mounted at either end thereof,
    a plurality of annular shroud members integral with said rigid members, each of said shroud members extending outwardly from the face of the associated said rigid members for receiving a coil structure thereabout.

4. The stator structure of claim 1 further comprising an insulating coating on said field structure and said rigid member including said shroud members.

5. In a dynamo-electric machine, a stator structure comprising
    a field structure having a plurality of annular laminated layers of magnetic material adapted to receive a rotor,
    a rigid plate having a configuration substantially identical to said annular laminated layers secured to both ends of said field structure, a pair of opposed arcuate shroud members integral with said rigid plates, each of said shroud members extending outwardly from the face of the associated rigid plate and said field structure, and a coil wound about associated shroud members at opposite ends of said field structure.

6. The stator structure of claim 5 wherein said rigid plates and said shrouds are of a magnetic material.

7. The stator structure of claim 5 further comprising an insulating coating on said field structure and said rigid plates including said shroud members.

References Cited

UNITED STATES PATENTS 2,265,809 12/1941 Korte et al. ---------- 310—194
3,226,585 12/1965 Roe --------------- 310—194

DAVID X. SLINEY, *Primary Examiner.*

MILTON O. HIRSHFIELD, *Examiner.*

L. L. SMITH, *Assistant Examiner.*